(12) United States Patent
Gounder et al.

(10) Patent No.: US 12,463,899 B2
(45) Date of Patent: Nov. 4, 2025

(54) SYSTEMS AND METHODS FOR TUNNELING NETWORK TRAFFIC TO APPLY NETWORK FUNCTIONS

(71) Applicant: Google LLC, Mountain View, CA (US)

(72) Inventors: Arivudainambi Appachi Gounder, Cupertino, CA (US); Bolei Fu, San Jose, CA (US); Stephen Stuart, Los Altos Hills, CA (US); Zhiwei Cen, San Jose, CA (US)

(73) Assignee: Google LLC, Mountain View, CA (US)

( * ) Notice: Subject to any disclaimer, the term of this patent is extended or adjusted under 35 U.S.C. 154(b) by 448 days.

(21) Appl. No.: 17/552,574

(22) Filed: Dec. 16, 2021

(65) Prior Publication Data

US 2023/0164073 A1 May 25, 2023

Related U.S. Application Data

(60) Provisional application No. 63/282,371, filed on Nov. 23, 2021.

(51) Int. Cl.
*H04L 12/66* (2006.01)
*H04L 45/00* (2022.01)
*H04L 45/74* (2022.01)

(52) U.S. Cl.
CPC ............. *H04L 45/74* (2013.01); *H04L 45/66* (2013.01)

(58) Field of Classification Search
CPC ... H04L 63/029; H04L 69/22; H04L 61/2575; H04L 63/20; H04L 69/16; H04L 2101/622; H04L 65/70; H04L 12/4641; H04L 12/4633; H04L 63/0272; H04L 61/103; H04L 45/745; H04L 2212/00

USPC ...... 370/392, 389, 351, 352, 395.52, 395.31
See application file for complete search history.

(56) References Cited

U.S. PATENT DOCUMENTS

| | | | |
|---|---|---|---|
| 8,825,900 B1 * | 9/2014 | Gross, IV | H04L 47/31 709/238 |
| 9,667,538 B2 | 5/2017 | Hammam et al. | |
| 2004/0223456 A1 * | 11/2004 | Mansharamani | H04L 47/30 370/229 |

(Continued)

OTHER PUBLICATIONS

Extended European Search Report for European Patent Application No. 22186658.5 dated Jan. 2, 2023. 8 pages.

*Primary Examiner* — Kharye Pope
(74) *Attorney, Agent, or Firm* — Lerner David LLP

(57) ABSTRACT

The systems and methods described herein provide a mechanism to apply network functions to a packet. The packet received by a network switch from a host may be configured so that the packet may be transmitted and forwarded to a target destination with desired network function, such as desired security settings, traffic path control or policy enforcement. In one example, the system may include a network switch and a network controller. The packet from hosts may enter the network switch through network ports (Px). The packet may then be tunneled and further transmitted to a server insertion to add a service identifier for the packet. The packet with the service modifier is then transmitted to a service block over the network. The service block may apply specific network functions to be processed or already processed to the packets. Subsequently, the packet with the specific network functions may then routes to the target destination with the desired network functions.

18 Claims, 4 Drawing Sheets

(56) References Cited

U.S. PATENT DOCUMENTS

| | | | |
|---|---|---|---|
| 2006/0174336 A1* | 8/2006 | Chen | H04L 63/104 726/11 |
| 2008/0219184 A1 | 9/2008 | Fowler et al. | |
| 2008/0253398 A1 | 10/2008 | Calvignac et al. | |
| 2010/0165985 A1 | 7/2010 | Sharma et al. | |
| 2011/0090911 A1 | 4/2011 | Hao et al. | |
| 2012/0099602 A1* | 4/2012 | Nagapudi | H04L 12/4633 370/401 |
| 2012/0163164 A1 | 6/2012 | Terry et al. | |
| 2013/0083725 A1* | 4/2013 | Mallya | H04W 74/002 370/328 |
| 2014/0056298 A1 | 2/2014 | Vobbilisetty et al. | |
| 2014/0086177 A1 | 3/2014 | Adjakple et al. | |
| 2014/0092907 A1* | 4/2014 | Sridhar | H04L 69/324 370/392 |
| 2014/0241247 A1* | 8/2014 | Kempf | H04W 76/12 370/328 |
| 2014/0317261 A1 | 10/2014 | Shatzkamer et al. | |
| 2014/0376555 A1 | 12/2014 | Choi et al. | |
| 2015/0009995 A1 | 1/2015 | Gross, IV et al. | |
| 2015/0036540 A1 | 2/2015 | Kasslin et al. | |
| 2015/0081840 A1 | 3/2015 | Patil et al. | |
| 2015/0098388 A1 | 4/2015 | Fang et al. | |
| 2015/0124826 A1 | 5/2015 | Edsall et al. | |
| 2015/0244617 A1 | 8/2015 | Nakil | |
| 2015/0281009 A1* | 10/2015 | Melcher | H04L 67/1042 709/224 |
| 2015/0319675 A1 | 11/2015 | Park et al. | |
| 2016/0014241 A1* | 1/2016 | Tai | H04L 12/4641 370/474 |
| 2016/0028625 A1 | 1/2016 | Hari et al. | |
| 2016/0128113 A1 | 5/2016 | Qi et al. | |
| 2016/0157193 A1 | 6/2016 | Qi et al. | |
| 2016/0226755 A1 | 8/2016 | Hammam et al. | |
| 2016/0330045 A1* | 11/2016 | Tang | H04L 45/745 |
| 2016/0352538 A1* | 12/2016 | Chiu | H04L 45/306 |
| 2017/0034769 A1 | 2/2017 | Kim et al. | |
| 2017/0063682 A1 | 3/2017 | Lentczner et al. | |
| 2017/0104850 A1* | 4/2017 | Arangasamy | H04L 12/4633 |
| 2017/0208030 A1 | 7/2017 | Qi et al. | |
| 2018/0006935 A1 | 1/2018 | Mutnuru et al. | |

* cited by examiner

SYSTEMS AND METHODS FOR TUNNELING NETWORK TRAFFIC TO APPLY NETWORK FUNCTIONS

CROSS-REFERENCE TO RELATED APPLICATIONS

The present application claims the benefit of the filing date of U.S. Provisional Patent Application No. 63/282,371 filed Nov. 23, 2021, the disclosure of which is hereby incorporated herein by reference.

BACKGROUND

A communication network typically includes a plurality of network devices, such as routers, switches, network address translation boxes, firewalls, load balancers, etc. Network-function virtualization (NFV) is a network architecture that virtualizes network node functions into building blocks that may be connected, or chained, to create communication services. In the network communication among different entities, such as network communication among campus or remote offices, network traffic between hosts is desired to be examined by a network function, such as Firewall, for security reasons.

SUMMARY

One aspect of the disclosure relates to a network control system for tunneling the network traffic from hosts to apply network functions and a method for using the same. The network functions may be achieved by utilizing a software defined network. In one example, the method includes receiving, by one or more processors, a packet via a network interface in a network switch in the network system. The packet is directed to a destination node other than the network switch. The packet is forwarded to a service insertion point controlled by a network controller. A service identifier is added to the packet. The packet is forwarded with the service identifier to a service block. One or more network functions are applied to the packet. The packet is forwarded to the destination node with the network function applied.

In one example, the network function comprises network address translation (NAT), encryption, access control list filtering, firewalling, intrusion detection, IP packet encryption (IPSec), policy enforcement, ACL or other firewall or network security functionality. A destination MAC of the packet is rewritten to encode the service identifier. When adding the service identifier, a first look-up process is performed. Identification information is mapped from the packet to the service identifier. When applying the network function to the packet, a second look-up process is performed. A host identifier and service identifier are used as search keys during the second look-up process. The host identifier comprises source IP address or MAC address.

In one example, when forwarding the packet to the service insertion point, the packet from the network switch is tunneled based on different ports received from the network switch. The different ports of the network switch may be configured in different VLANs. The network controller may be a software defined network controller. The service identifier may be encoded a MAC address field, VLAN tag field, Generic Routing Encapsulation header field, or Multiprotocol Label Switching header field associated with the packet.

Another aspect of the disclosure relates to a network system for applying network functions to a packet. The network system includes one or more processors, tangible computer readable media storing computer executable instructions, which when executed by the processor cause the processors to receive a packet via a network interface in a network switch in the network system, wherein the packet is directed to a destination node other than the network switch, forward the packet to a service insertion point controlled by a network controller in the network system, add a service identifier to the packet, forward the packet with the service identifier to a service block, apply a network function to the packet, and forward the packet with the network function applied to the destination node. The network function includes network address translation (NAT), encryption, access control list filtering, firewalling, intrusion detection, IP packet encryption (IPSec), policy enforcement, ACL or other firewall or network security functionality. A destination MAC of the packet is rewritten at the service insertion point to encode the service identifier.

In one example, a first look-up process is performed at the service insertion point. Identification information is mapped from the packet to the service identifier.

In one example, a second look-up process is performed at the service block. A host identifier and service identifier are used as search keys during the second look-up process. The host identifier includes source IP address or MAC address. The packet is tunneled from the network switch based on different ports received from the network switch prior to forwarding the packet to a service insertion point. The different ports of the network switch are configured in different VLANs. The network controller comprises a software defined network controller.

Still another aspect of the disclosure comprises tangible computer readable media storing computer executable instructions, which when executed by the processor cause the processor to receive a packet via a network interface from a host to the network switch, wherein the packet is directed to a destination node other than the network switch, tunnel the packet based on ports configured in the network switch, wherein the different ports of the network switch is configured in different VLANs, and forward the packet to a service insertion point and further to a service block to apply a network function to the packet.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. For purposes of clarity, not every component may be labeled in every figure. Like reference numbers and designations in the various figures indicate like elements. The drawings are not intended to limit the scope of the present teachings in any way. The system and method may be better understood from the following illustrative description with reference to the following drawings in which.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

The systems and methods described herein provide a mechanism to apply network functions to a packet. The packet received by a network switch from a host may be configured so that the packet may be transmitted and forwarded to a target destination with desired network function applied, such as desired security settings, traffic path control or policy enforcement. In one example, the system may include a network switch and a network controller. The packet from hosts may enter the network switch through network ports (Px). The packet may then be tunneled and further transmitted to a server insertion point to add a service identifier for the packet. The packet with the identifier is then transmitted to a service block over the network. The service block may apply specific network functions to be processed or already processed to the packets. Subsequently, the packet is routed to the actual destination with the specific network functions applied.

Figure 1:
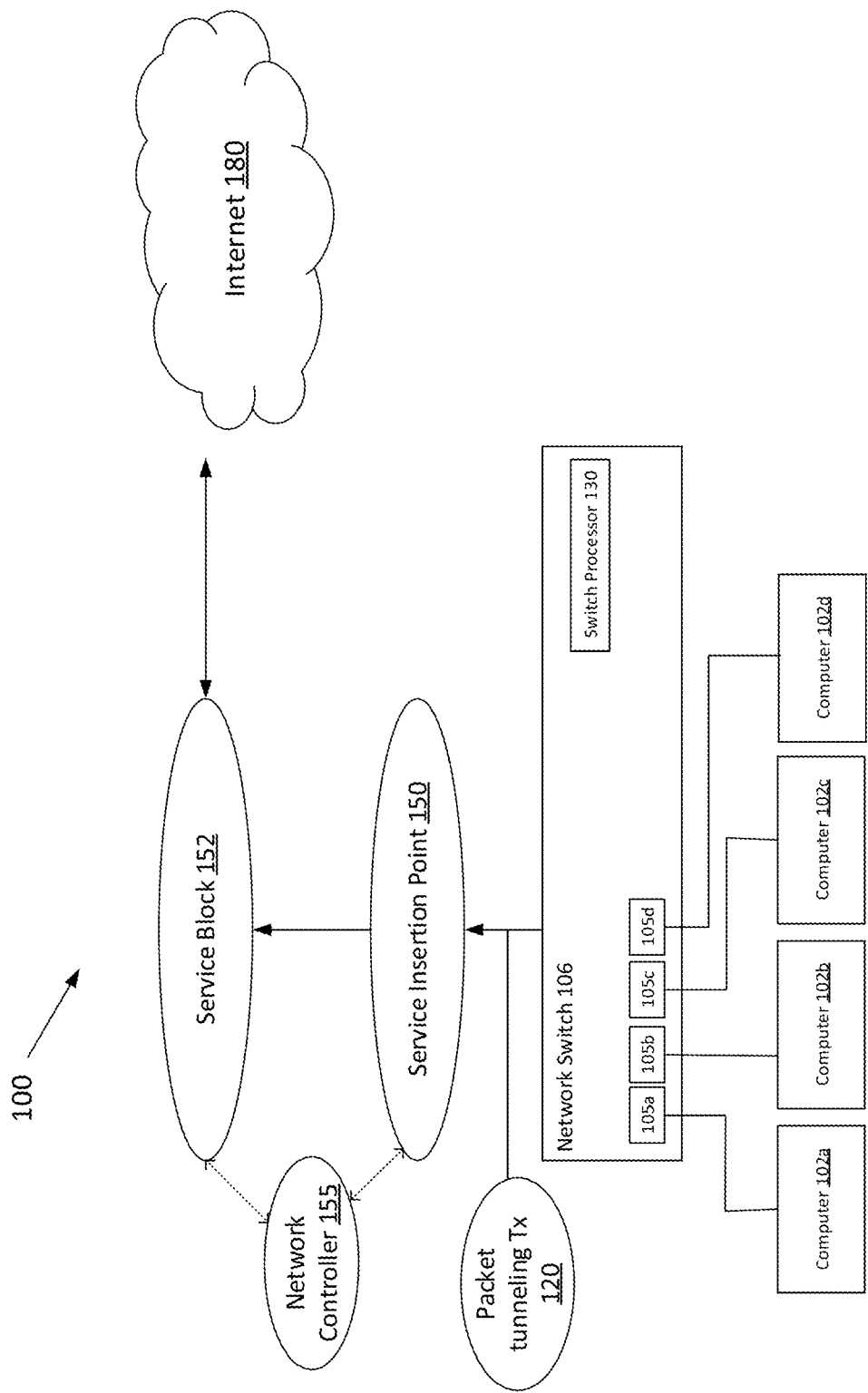
FIG. 1 is a schematic diagram of a network system.

FIG. 1 is a schematic diagram of a network system 100. The network system 100 for applying network functions to a packet includes a network switch 106 and a network controller 155. A service insertion point 150 and a service block 152 may be in electrical communication with the network switch 106. The service insertion point 150 and the service block 152 may apply network functions to the packets transmitted from the network switch 106. The service block 152 and the service insertion point 150 may be, for example, one or more programmable software switches managed by a network controller 155. The network controller 155 may configure the network functions in the service block 152 and the service insertion point 150. The network controller 155 may be software defined, hardware, or otherwise constructed.

In one embodiment, the network switch 106 is a multiport network bridge that uses hardware addresses to process and forward data at the data link layer (layer 2) of the Open Systems Interconnection (OSI) model. For example, the network switch 106 can be an Ethernet switch having a number of ports or network interfaces. By way of example only, the network switch may have 5, 8, 10, 24, 48, or more ports. FIG. 1 illustrates the network switch as having 4 ports 105a-105d.

In some implementations, the network switch 106 can be a router with network layer (layer 3) routing and switching capability. In some implementations, the network switch 106 can serve a network gateway to an enterprise network or a data center.

The network switch 106 is connected to computers 102a-102d directly or indirectly through other network devices, including other network switches that are further connected to. The network switch 106 processes and forwards data received from the computers 102a-102d as well as from, for example, the internet 180. In some other implementations, the network switch 106 is not connected to the Internet 180, but instead is located at a gateway between one local area network and network or at any other location within a network where network function application may be desired.

In some embodiments, the port through which a connection to the computers 102a-102d is made is a dedicated control plane port, such as an OpenFlow or OpenFlow compatible port.

The network switch 106 may include a switch processor 130. The switch processor 130 executes routing, forwarding, and network function applications, as described further below.

When the network switch 106 receives a packet, before routing the packet to the next node along a network path, the switch processor 130 causes the network switch 106 to forward the packet to the service insertion point 150 and a service block 152 to apply network functions to the packet for packet processing.

In brief overview of the network function application or virtualization process, a packet may be received by the network switch 106 for a destination node outside the network, for example, across the Internet 180. The switch processor 130 examines the packet and tunnels the packets (Tx) 120 to the service insertion point 150 and further to the service block 152 for further packet processing. The packet may be tunneled to include an identification information to the packet. In one example, the tunneled packet 120 includes a tunnel identifier. The switch processor 130 from the ports 105a-105d may map, identify and tunnel the packet with the identification information and then transmit the packet to the service insertion point 150. The switch processor 130 may be configured and programed so that each of the ports 105a-105d from the network switch 106 may process different sets of packets without internal communications among the ports 105a-105d. For example, the port 105a and the port 105b may be in different VLANs so that the packets as received may be configured, tunneled or transmitted through different network paths with different identification information tagged.

In some examples, the switch processor 130 may be configured for use in software defined networks (SDNs). In this example, the switch processor 130 can rely on a central SDN processor to carry out the functionality of the routing or forwarding functions remotely.

As the packets forwarded to the service insertion point 150, the service insertion point may perform a first look-up process using the identification information from the packet as a search key. The identification information is then mapped from a look-up table to return or insert a service identifier to the packet. The look-up table may be saved in a memory cache utilized in a network controller 155 that may be in communication with the service insertion point 150. The network controller 155 may program the memory cache with the identification information and service identifier mapping. Identification information can be included in various fields that are already included in a layer 2 or layer 3 packet, including, the MAC address field (e.g., destination MAC address field or source MAC address field), the VLAN tag field, the Generic Routing Encapsulation (GRE) header field, the Multiprotocol Label Switching (MPLS) header field (or in MPLS labels), etc. In some examples, a packet may be tagged with one or more identifiers, indicating more than one network function is to be carried out or has been carried out. In implementations in which a dedicated control plane port, such as an OpenFlow port is used, the identifiers can be placed in any of the packet header fields referenced above, with the packet encapsulated within a control plane packet, such as an OpenFlow PacketIn or PacketOut message. In some implementations, for packets forwarded to the service block 152, the identifiers may instead or additionally be included along with the encapsulation, such as in the "cookie" field included in the OpenFlow PacketIn message. In one example, the destination MAC address (Media Address Control Address) may be rewritten using the service identifier for further packet transmission and network function application. In one example, the service identifier may include a MAC address field, VLAN tag field, Generic Routing Encapsulation header field, or MPLS header field associated with the packet.

Subsequently, the packet with the service identifier and the updated MAC address is further transmitted to the service block 152 over the network. The service block 152 then performs a second look-up process using a service identifier and host identifier as a search key. The host identifier may include a source IP address or MAC address. The look-up table may be accessed in a memory cache utilized in the network controller 155 or other suitable memory devices configured and utilized in the network system 100. The look-up table can further store a list of network functions to be applied to a packet associated with various flows or destined for various IP addresses prior to the packet being forwarded to the next node. In other implementations, the list of network functions to be applied to a packet can be associated with other packet information, including, without limitation, routing information or layer 4 packet data. Result of the second lookup is the next-hop information needed to send the packet to a network function. This next-hop information needs to be captured.

Thus, after the second look-up process in the service block 152, if a network function is identified, the packet is tagged with an identifier for a specific network function. The network controller 155 may be in communication with the service block 152 and programs the service block 152 such that traffic is routed through the network functions and eventually to the internet 180. The service block 152 contains the processed packet and passes along the processed packet to the next node along a network path through the internet 180.

In one example, the specific network function that may be implemented may include network address translation (NAT), encryption, access control list filtering, firewalling, intrusion detection, IP packet encryption (IPSec), policy enforcement, ACL or other firewall or network security functionality, such as denial of service attack or intrusion detection. Each of the specific network functions can be implemented as computer executable instructions stored on a tangible computer readable medium, and which are executed by a multiprocessor included within processors from the network controller 155, described further below.

In one example, the network controller 155 may include processors, such as a general-purpose processor, that may execute computer executable instructions stored on a tangible computer readable medium. For example, the network controller 155 can be implemented in an architecture similar to that shown in FIG. 3. In some examples, a computer server hosts the network controller 155. In some examples, the switch processor 130 can be or can include special purpose circuitry such as an application-specific integrated circuit (ASIC) or a field-programmable gate array (FPGA).

Figure 2A:
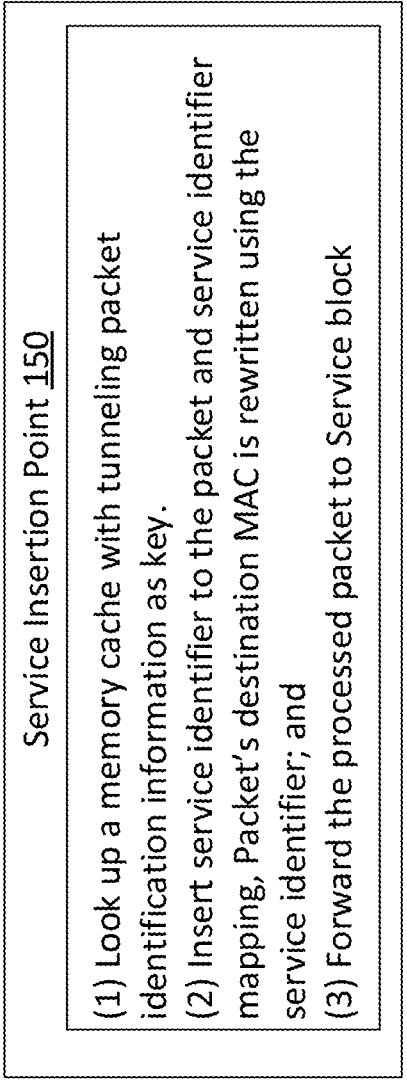
FIG. 2A-2B are block diagrams of the service insertion point and the service block shown in FIG. 1.
Figure 2B:
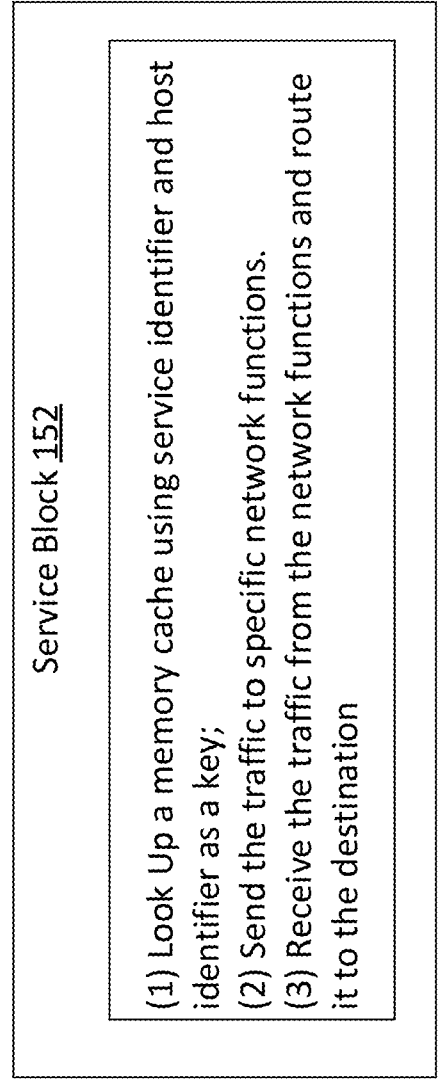

FIGS. 2A-2B are block diagrams of the functions of the service insertion point 150 and the service block 152 shown in FIG. 1. As described above, as depicted in FIG. 2A, the service insertion point 150 may receive the packet tunneled from the network switch 106. Once the packet is received, a first look-up process may be performed to insert the service identifier to the packet. Destination MAC may also be rewritten based on the packet as received.

Once the packet is transmitted to the service block 152, as shown in FIG. 2B, a second look-up process is performed using a service identifier or a host identifier as a search key. Subsequently, the packet is applied with the specific network functions. Once the network function is applied and added to the packet, the packet is then reverted back to the service block 152 and the service block 152 transmits the packet with the specific network function to the target destination node through the network path, or through the internet.

Figure 3:
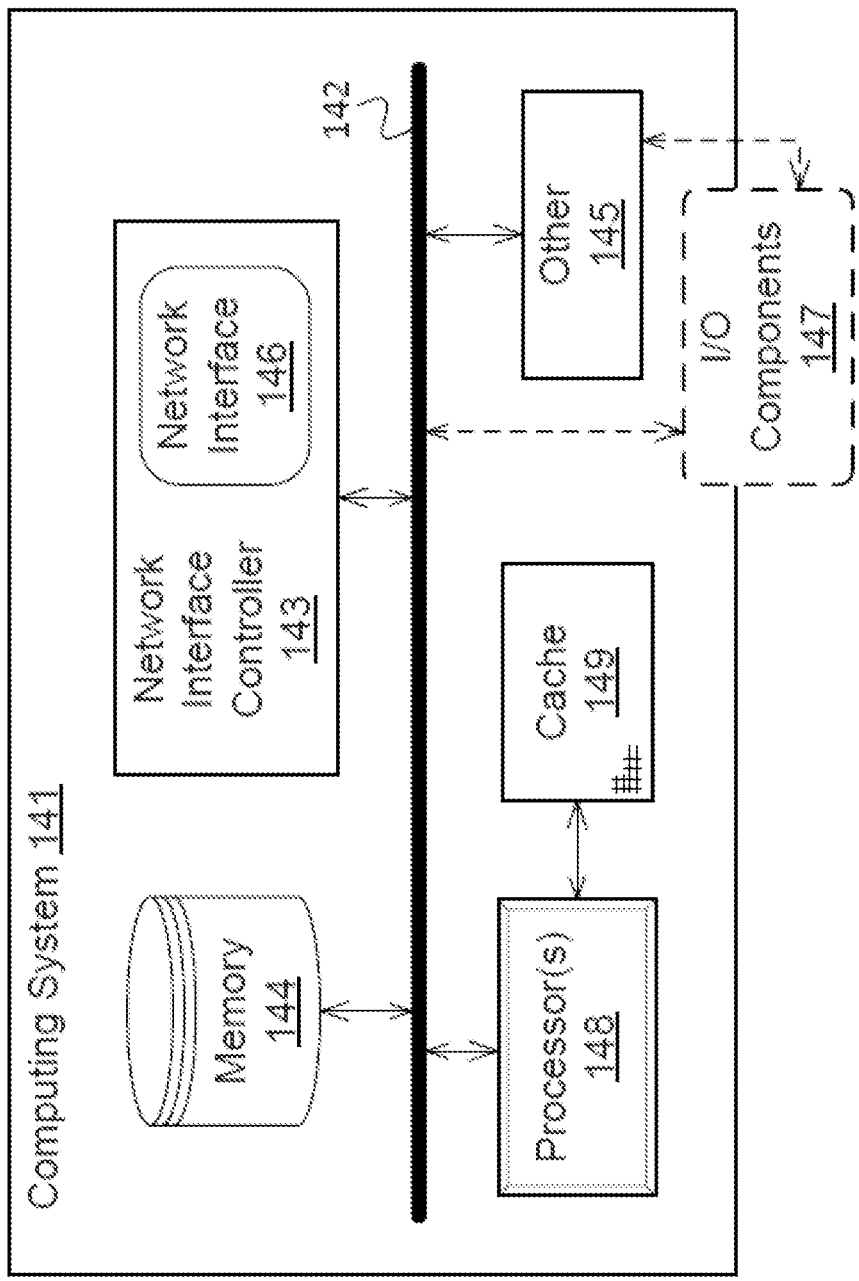
FIG. 3 is a block diagram for a computing system suitable for use in the various implementations described.

FIG. 3 is a block diagram of an example computing system 141, which may be configured as the network switch 106 and/or the network controller 155. In one example, the computing system 141 includes at least one processor 148 for performing actions in accordance with instructions and one or more memory devices 144 or 149 for storing instructions and data. The illustrated example computing system 141 includes one or more processors 148 in communication, for example via a bus 142, with memory 144, at least one network interface controller 143 with network interface port 146 for connection to a network (not shown), and other components 145, e.g., input/output ("I/O") components 147. Generally, the processor(s) 148 will execute instructions received from memory. The processor(s) 148 illustrated incorporate, or are connected to, cache memory 149. In some instances, instructions are read from memory 144 into cache memory 149 and executed by the processor(s) 148 from cache memory 149.

In more detail, the processor(s) 148 may be any logic circuitry that processes instructions, e.g., instructions fetched from the memory 144 or cache 149. In many embodiments, the processor(s) 148 are microprocessor units or special purpose processors. The computing device 141 may be based on any processor, or set of processors, capable of operating as described herein. The processor(s) 148 may be single core or multi-core processor(s). The processor(s) 148 may be multiple distinct processors. In some implementations, the processor(s) 148 are implemented as circuitry on one or more "chips."

The memory 144 may be any device suitable for storing computer readable data. The memory 144 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto-optical disks, and optical discs (e.g., CD ROM, DVD-ROM, or Blu-Ray® discs). A computing system 141 may have any number of memory devices 144.

The cache memory 149 is generally a form of computer memory placed in close proximity to the processor(s) 148 for fast access times. In some implementations, the cache memory 149 is part of, or on the same chip as, the processor(s) 148. In some implementations, there are multiple levels of cache 149, e.g., L2 and L3 cache layers.

The network interface controller 143 manages data exchanges via the network interface 146. The network interface controller 143 handles the physical and data link layers of the OSI model for network communication. In some implementations, some of the network interface controller's tasks are handled by one or more of the processor(s) 148. In some implementations, the network interface controller 143 is incorporated into the processor 148, e.g., as circuitry on the same chip.

In some implementations, a computing system 141 has multiple network interfaces 146 controlled by a single controller 143. In some implementations, a computing system 141 has multiple network interface controllers 143. In some implementations, each network interface 146 is a connection point for a physical network link, e.g., a cat-5 Ethernet link. In some implementations, the network interface controller 143 supports wireless network connections and an interface port 146 is a wireless (e.g., radio) receiver/transmitter. In some implementations, the network interface controller 143 implements one or more network protocols such as Ethernet. Generally, a computing device 141 exchanges data with other computing devices via physical or wireless links through a network interface 146. The network interface 146 may link directly to another device or to another device via an intermediary device, e.g., a network device such as a hub, a bridge, a switch, or a router, connecting the computing device 141 to a data network such as the Internet.

The computing system 141 may include, or provide interfaces for, one or more input or output ("I/O") components 147. Input devices include, without limitation, keyboards, microphones, touch screens, sensors, pointing devices such as a mouse or trackball, etc. Output devices include, without limitation, video displays, speakers, printers, etc.

The other components 145 may include an I/O interface, external serial device ports, and any additional co-processors. For example, a computing system 141 may include an interface, e.g., a universal serial bus ("USB") interface, for connecting input devices, output devices, or additional memory devices, e.g., portable flash drive or external media drive. In some implementations, a computing device 141 includes an additional device 145 such as a co-processor. For example, a math co-processor can assist the processor 148 with high precision or complex calculations.

Figure 4:
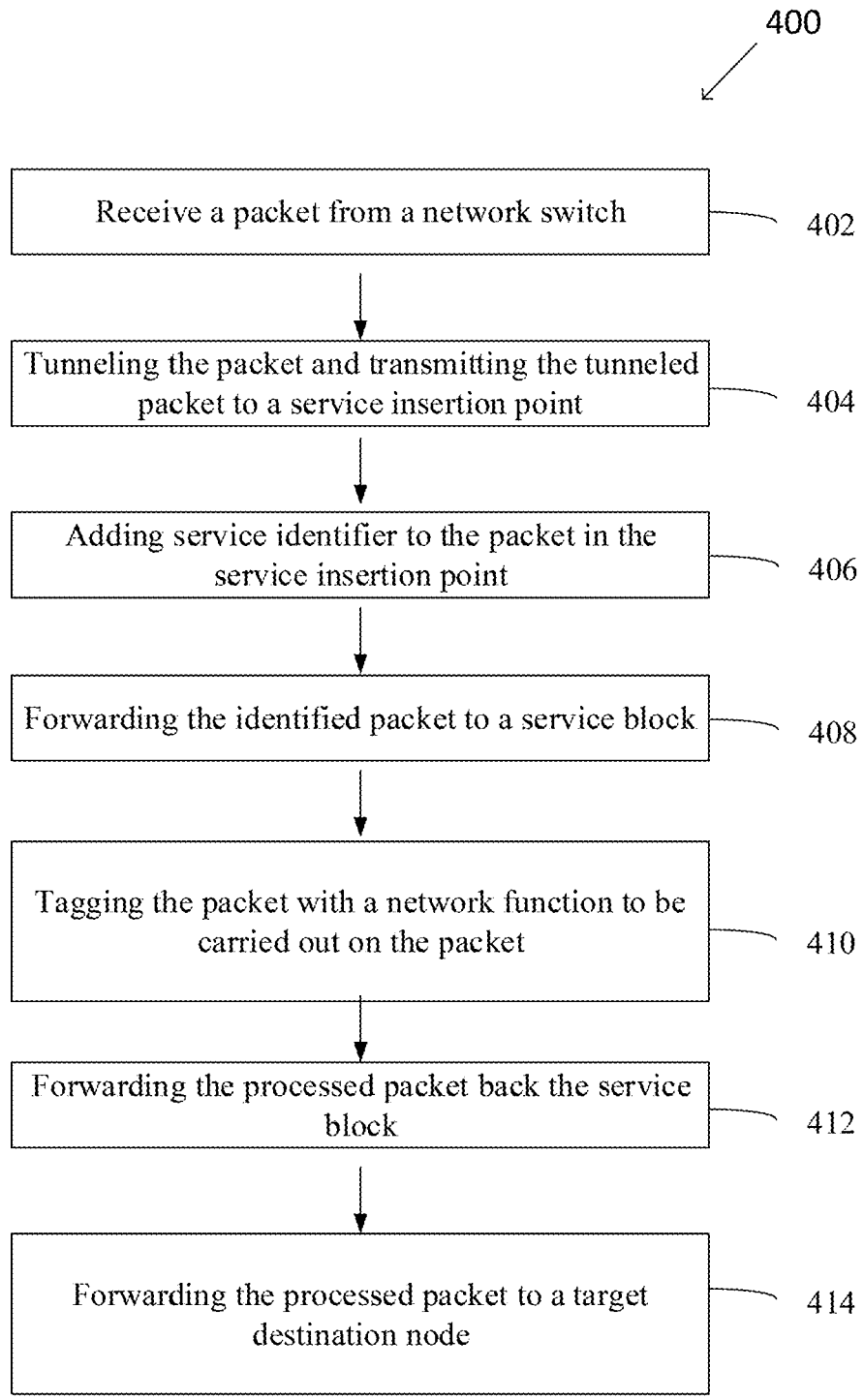
FIG. 4 is a flow chart of an example method for applying network functions using the system illustrated in FIG. 1.

FIG. 4 is a flow chart of an example method 300 for applying network functions to a packet using the system illustrated in FIG. 1. Such method may be performed using suitable processes or any suitable techniques. It should be understood that the operations involved in the following methods need not be performed in the precise order described. Rather, various operations may be handled in a different order or simultaneously, and operations may be added or omitted.

Referring to FIG. 4, in block 402, a packet is received by a network switch.

In block 404, the packet is tunneled by the network switch and the tunneled packet is transmitted to a service insertion point.

In block 406, a service identifier is added to the packet in the service insertion point.

In one example, a first look-up process may be performed to map identification information from the packet to the service identifier. In one example, a destination MAC of the packet may be rewritten to encode the service identifier.

In block 408, after the service identifier is added to the packet, the identified packet is then forwarded to a service block.

In block 410, the identified packet is tagged with a network function by a network controller.

In one example, the network function includes network security functionality. The network security functionality includes one or more of network address translation (NAT), encryption, access control list (ACL) filtering, firewalling, intrusion detection, IP packet encryption (IPSec) or policy enforcement. When tagging the network function, a second look-up process may be performed using a host identifier and service identifier as search keys during the second look-up process.

In block 412, once the network function is applied and processed to the packet, the packet is then further forward back to the service block.

In block 414, the processed packet is then forward to a target destination node such as internet.

The systems and methods described herein provide a mechanism to apply network functions to a packet. The packet from the host may be configured so that the packet may be transmitted and forwarded to a target destination with desired network function, such as desired security settings, traffic path control or policy enforcement. In one example, the system may include a network switch and a network controller. The packet from hosts may enter the network switch through network ports (Px). The packet may then be tunneled and further transmitted to a server insertion port may then add a service identifier for the packet. The packet with the service modifier is then transmitted to a service block over the network. The service block may apply specific network functions to be processed or already processed to the packets. Subsequently, the packet with the specific network functions may then routes to the target destination with the desired network functions. By doing so, specific configurations or network functions may be applied to the packet with desired setting, such as security control, policy enforcement and the like.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A method for applying network functions to a packet, comprising:
    receiving a packet via a network interface port of a network switch, wherein the packet is directed to a destination node other than the network switch;
    tunneling, by the network switch, the packet to a service insertion point controlled by a network controller, wherein the packet includes identification information and a host identifier;
    storing in a memory cache of a network controller, a first look-up table comprising a collection of service identifiers;
    determining, by the service insertion point, a service identifier by mapping the identification information of the packet to the service identifier within the look-up table;
    adding, by the service insertion point, the service identifier to the packet;
    forwarding, by the service insertion point, the packet with the service identifier to a service block;
    storing in the cache of the network controller, a second look-up table having a key comprising the host identifier and the service identifier;
    determining, by the service block, based on the host identifier and the service identifier, one or more network functions to apply to the packet;
    applying, by the service block, the one or more network functions to the packet; and
    forwarding, by the service block, the packet with the network function to the destination node.

2. The method of claim 1, wherein the network function comprises network security functionality.

3. The method of claim 2, wherein the network security functionality comprises one or more of network address translation (NAT), encryption, access control list (ACL) filtering, firewalling, intrusion detection, IP packet encryption (IPSec) or policy enforcement.

4. The method of claim 1, wherein adding, by the one or more processors, the service identifier further comprises:
    rewriting, by the one or more processors, a destination MAC of the packet to encode the service identifier.

5. The method of claim 1, wherein applying, by the one or more processors, the network function to the packet further comprises:
    performing, by the one or more processors, a second look-up process;
    using, by the one or more processors, a host identifier and service identifier as search keys during the second look-up process.

6. The method of claim 5, wherein the host identifier comprises source IP address or MAC address.

7. The method of claim 1, wherein forwarding, by the one or more processors, the packet to the service insertion point further comprises:
    tunneling, by the one or more processors, the packet from the network switch based on different ports received from the network switch.

8. The method of claim 7, wherein the different ports of the network switch are configured in different VLANs.

9. The method of claim 1, wherein the service identifier comprises a MAC address field, VLAN tag field, Generic Routing Encapsulation header field, or Multiprotocol Label Switching header field associated with the packet.

10. A network system for applying network functions to a packet, comprising:
    one or more processors;
    tangible computer readable media storing computer executable instructions, which when executed by the processor cause the processors to:
        receive a packet via a network interface port of a network switch in the network system, wherein the packet is directed to a destination node other than the network switch;
        tunnel the packet to a service insertion point controlled by a network controller in the network system wherein the packet includes identification information and a host identifier;
        store a first look-up table in a cache memory cache of a network controller, the first look-up table comprising a collection of service identifiers;
        determine by the service insertion point, a service identifier by mapping the identification information of the packet to the service identifier within the first lookup table;
        add by the service insertion point, a service identifier to the packet;
        forward by the service insertion point, the packet with the service identifier to a service block;

store a second look-up table in the cache of the network controller, the second look-up table comprising a key value based on the host identifier and the service identifier;

determine by the service block, based on the host identifier and the service identifier, one or more network functions to apply to the packet;

apply by the service block, a network function to the packet; and forward by the service block, the packet with the network function applied to the destination node.

11. The network system of claim 10, wherein the network function comprises network security functionality.

12. The network system of claim 10, wherein the one or more processors are further configured to:

rewrite, by the one or more processors, a destination MAC of the pocket to encode the service identifier.

13. The network system of claim 10, wherein the one or more processors are further configured to:

perform, by the one or more processors, a second look-up process;

use, by the one or more processors, a host identifier and service identifier as search keys during the second look-up process.

14. The network system of claim 10, wherein the host identifier comprises source IP address or MAC address.

15. The network system of claim 10, further comprising:

tunnel, by the one or more processors, the packet from the network switch based on different ports received from the network switch prior to forwarding the packet to a service insertion point.

16. The network system of claim 15, wherein the different ports of the network switch is configured in different VLANs.

17. The network system of claim 10, wherein the network controller comprises a software defined network controller.

18. A network switch, comprising:

one or more processors;

tangible computer readable media storing computer executable instructions, which when executed by the processor cause the processor to:

receive a packet via a network interface port of the network switch from a host to the network switch, wherein the packet is directed to a destination node other than the network switch;

tunnel the packet to a service insertion point based on ports configured in the network switch, wherein the different ports of the network switch are configured in different VLANs;

determine by the service insertion point a service identifier by mapping the identification information of the packet to the service identifier within a look-up table stored in a memory cache of a network look-controller, the look-up table comprising a collection of service identifiers; and forward the packet with the service identifier to a service block to apply a network function to the packet.

* * * * *